United States Patent [19]

Kobayashi

[11] Patent Number: 4,825,304

[45] Date of Patent: Apr. 25, 1989

[54] RECORDING DISC WITH SYNC INFORMATION DISPOSED IN RADIAL ALIGNMENT

[75] Inventor: Yoshikazu Kobayashi, Kawasaki, Japan

[73] Assignee: Nippon Columbia Kabushikikaisha, Tokyo, Japan

[21] Appl. No.: 251,925

[22] Filed: Sep. 28, 1988

Related U.S. Application Data

[60] Continuation of Ser. No. 908,914, Sep. 18, 1986, abandoned, which is a continuation of Ser. No. 727,595, Apr. 26, 1985, abandoned, which is a division of Ser. No. 395,979, Jul. 7, 1982, Pat. No. 4,543,617.

[30] Foreign Application Priority Data

Jul. 15, 1981 [JP] Japan .................... 56-110361

[51] Int. Cl.$^4$ .................... H04N 5/76; G11B 7/00
[52] U.S. Cl. ...................... 358/342; 360/27; 369/111
[58] Field of Search .............. 358/342, 335; 360/27, 360/33.1; 369/111, 275, 47, 109

[56] References Cited

U.S. PATENT DOCUMENTS

| | | | |
|---|---|---|---|
| 3,701,846 | 3/1970 | Zenzefilis | 360/33.1 |
| 3,796,825 | 3/1974 | Redlich | 358/342 |
| 3,852,520 | 12/1974 | Bruch | 358/32.8 |
| 3,931,460 | 1/1976 | Watson | 369/111 |
| 4,188,646 | 2/1980 | Sordello et al. | 360/77 |
| 4,223,347 | 9/1980 | Bouwhuis | 358/342 |
| 4,227,213 | 10/1980 | Isobe et al. | 358/343 |

FOREIGN PATENT DOCUMENTS 714365 8/1954 United Kingdom ............... 358/342

OTHER PUBLICATIONS

"System Coding Parameters Mechanics and Electromechanics of the Reflective Video Disc Player" by Bogels; SMATE Journal (Feb. 1977) vol. 86, No. 2, p. 74.

Primary Examiner—Robert L. Richardson
Attorney, Agent, or Firm—Bauer & Schaffer

[57] ABSTRACT

A recording disc on which a frequency modulated (FM) signal is recorded as pits or dots along a track formed as a concentric or spiral shape in such a manner that the pits or dots are arranged on a radial line during at least a predetermined interval.

4 Claims, 12 Drawing Sheets

RECORDING DISC WITH SYNC INFORMATION DISPOSED IN RADIAL ALIGNMENT this a continuation of Ser. No.: 908,914, filed 9/18/86 and now abandoned; Continuation of Ser. No. 727,595, filed 4/26/85, now abandoned; Division of Ser. No. 395,979, filed 7/7/82, now U.S. Pat. No. 4,543,617 of 9/24/85.

BACKGROUND OF THE INVENTION

1. Field of the Invention

This invention relates to recording apparatus in which a recording signal such as a video signal or the like is frequency-modulated and then recorded on a recording medium and in particular to a recording disc on which said recording is made.

2. Description of the Prior Art

A prior art video disc recording apparatus will be described first.

Figure 1:
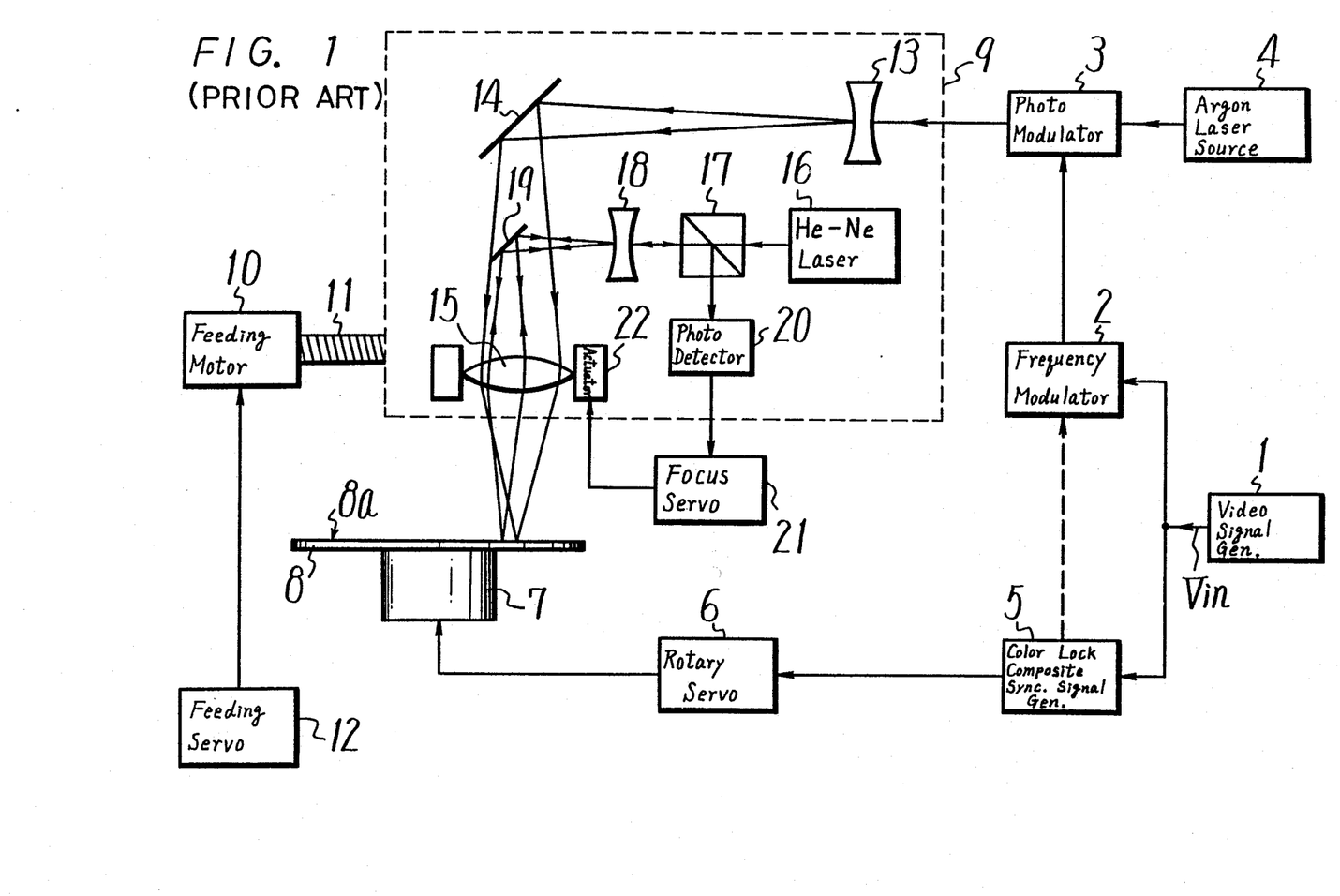
FIG. 1 is a systematic block diagram schematically showing a prior art video disc recording apparatus.

FIG. 1 is a systematic block diagram thereof, in which reference numeral 1 denotes a video signal generator, 2 a frequency modulator to receive an output video signal $V_{in}$ supplied from the video signal generator 1, 3 denotes an optical or photo modulator and 4 denotes an argon Ar laser source. The light beam emitted from the argon laser source 4 is turned on and off by the photo modulator 3 in response to the signal-modulated (FM) frequency derived from the frequency modulator 2. Numeral 5 denotes a color lock composite synchronizing signal generator supplied with the video signal $V_{in}$ from the video signal generator 1 to generate a color lock composite synchronizing signal. Numeral 6 denotes a rotary servo, 7 denotes a motor, and numeral 8 denotes a recording disc. The rotary servo 6 is supplied with the output from the color lock composite synchronizing signal generator 5 so as to rotate the motor 7 at, for example, 1800 r.p.m in synchronism with the frame of the video signal.

In the conventional video disc recording apparatus, the frequency modulator 2 and the color lock composite synchronizing signal generator 5 are provided independently and therefore they have no relation between them. The dotted line in FIG. 1, which seems to connect both together is added to clarify the characteristics of the present invention as will be described later.

Numeral 9 designates an optical system feeding base, 10 denotes a feeding motor 11 is a guide shaft for the optical system feeding base 9, and 12 designates a feeding servo for the feeding motor 10. The feeding motor 10 is controlled by the feeding servo 12 so as to align the track pitch on the video disc 8, whereby the optical system feeding base 9 is forwarded at a predetermined feeding pitch (for example, 1.6 μm).

The light beam derived from the argon laser source 4 and turned on and off by the photo modulator 3 is spread by an concave lens 13 provided within the optical system feeding base 9. The optical path (optical axis) of the beam is changed by 90° by a half mirror 14 and passed through a recording lens 15 to focus on the recording disc 8, whereby pits or dots (refer to FIG. 2) are formed on its recording surface 8a. A light beam derived from a helium He -neon laser 16 provided on the optical system feeding base 9 is passed through a beam splitter 17 and spread apart by a concave lens 18. The optical axis thereof is changed by 90° by a half mirror 19 and impinged through the recording lens 15 on the recording disc 8 to be reflected therefrom. The reflected beam is again passed through the recording lens 15, and its optical axis is changed by 90° by the half mirror 19 and passed through the concave lens 18. The optical axis thereof is changed by 90° by the beam splitter 17 and detected by an optical or photo detector 20. The output of the photo detector 20 is applied as a servo signal to a focus servo 21, the output of which is supplied to an actuator 22 so as to control the position of the recording lens 15 such that the light beam emitted from the argon laser source 4 focuses on the recording disc 8.

Figure 2:
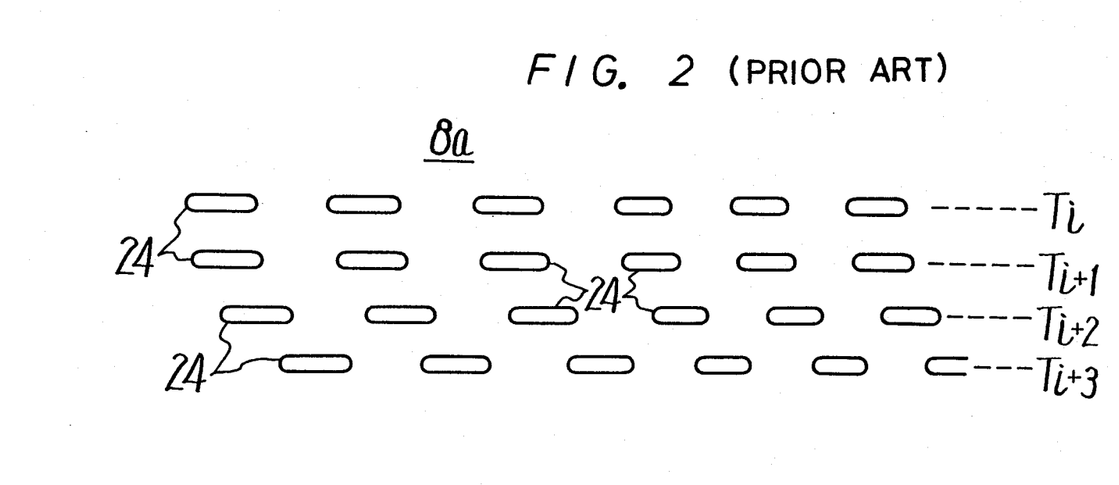
FIG. 2 is an enlarged diagram showing a pit arrangement state of a prior art video disc.

FIG. 2 is an enlarged diagram showing the arrangement state of pits or dots 24 formed on the recording surface 8a of the recording disc 8 as set forth above. Although in the previously proposed technique, in order to record the video signal of one frame on a track T of one circle form on the recording surface 8a of the recording disc 8, the rotation of the motor 7 is controlled, the FM frequency per se corresponding to the momentary value of the video signal level is not accurately synchronized in phase with each other at every frame so that the pits 24 in adjacent tracks, are not formed in an aligned state as, for example, tracks $T_i$ and $T_{i+1}$ (where i is a positive integer) as shown in FIG. 2. Thus in the reproducing mode, depending upon the size of the diameter of the reproducing light beam, crosstalk and jitter are caused making it difficult to increase the recording density and it is necessary to compensate for the jitter.

OBJECTS AND SUMMARY OF THE INVENTION

Accordingly, an object of the present invention is to provide a recording apparatus and a recording disc thereby which can obviate the aforesaid defects.

Another object of the present invention is to provide a recording apparatus which can record a recording signal so as to reduce crosstalk between adjacent tracks caused in a reproducing mode, and a recording disc formed thereby.

A further object of the present invention is to provide a recording apparatus in which a frequency modulated (FM) signal corresponding to a recording signal is defined at every momentary level and locked to a synchronizing signal or clock signal so as to align pits between adjacent tracks thereby allowing the same to be recorded on a recording disc, and a recording disc formed thereby, in which crosstalk and jitter caused in a reproducing mode can be minimized.

According to an aspect of the present invention, there is provided a recording apparatus for recording a recording signal, which includes synchronizing signals arranged at selected intervals, on a disc comprising:

a frequency generating means for generating a plurality of frequencies synchronized with said synchronizing signal;

a selecting means for selecting frequencies corresponding to respective levels of said recording signal from said plurality of frequencies;

a means for synchronizing the rotation of said disc, on which said recording signal and said synchronizing signal are recorded to thereby rotate said disc at a constant rotation speed being an integer of the period of said synchronizing signal; and a means for recording an output from said selecting means on the rotating disc.

According to another aspect of the present invention, there is provided a recording disc on which a frequency modulated (FM) signal provided by frequency-modulating a recording signal, is recorded as a series of dots arranged concentrically or spirally on the recording surface the dots being each arranged on the recording surface, at least during a predetermined interval so as be in radial alignment.

The other objects, features and advantages of the invention will become apparent from the following description taken in conjunction with the accompanying drawings through which the like references designate the same elements and parts.

BRIEF DESCRIPTION OF THE DRAWINGS

FIG. 5 (formed of FIGS. 5A and 5B) is a block diagram showing one example of the video level FM frequency generator shown in FIG. 3;

DESCRIPTION OF THE PREFERRED EMBODIMENTS

Figure 3:
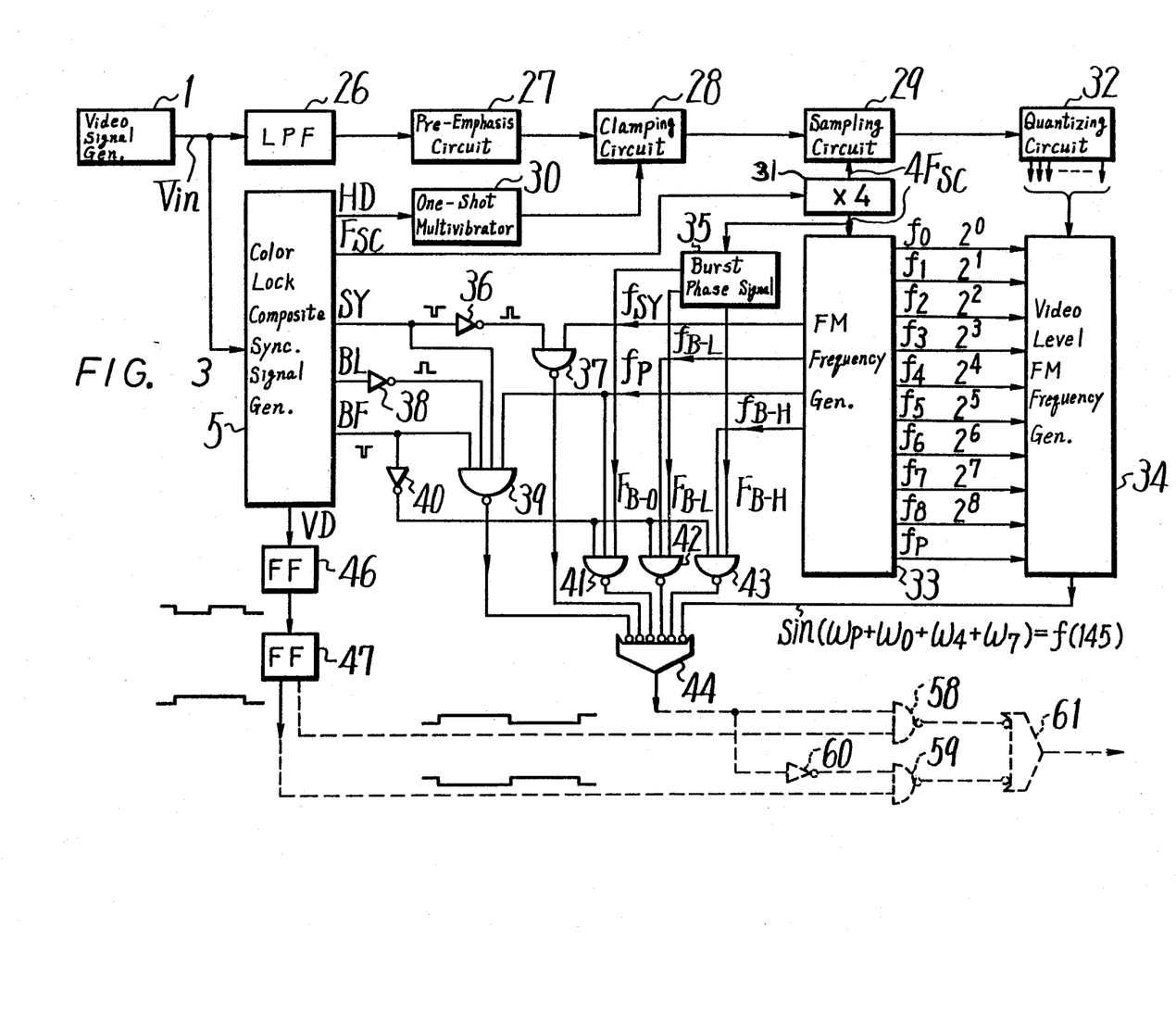
FIG. 3 is a block diagram schematically showing one example of a digital frequency modulation (FM) section which is a main section of the present invention.

FIG. 3 is a block diagram showing an example of a digital frequency modulation (FM) section used in a recording apparatus according to the present invention. In the example of FIG. 3, the video signal $V_{in}$ derived from the video signal generator 1 is applied through a low pass filter 26 a pre-emphasis circuit 27 and a clamping circuit 28 to a sampling circuit 29. The video signal $V_{in}$ is also introduced to the color lock composite synchronizing signal generator 5, from which predetermined vertical driving signal VD, horizontal driving signal HD, subcarrier signal $F_{SC}$, composite synchronizing signal SY, blanking signal BL and burst flag signal BF are generated. The horizontal driving signal HD is applied to a one-shot multivibrator 30 which produces a pedestal clamp pulse. This pedestal clamp pulse is supplied to the clamping circuit 28, whereby the Component is added to the video signal $V_{in}$. The subcarrier signal $F_{SC}$ is supplied to a four-time frequency multiplier 31, in which it is converted to the signal with the frequency four times (4 $F_{SC}$) higher than the original frequency. This signal with the frequency 4 $F_{SC}$ is supplied to the sampling circuit 29 as the sampling frequency, whereby the video signal $V_{in}$ thus clamped is sampled and then the sampled output thereof is supplied to a quantizing circuit 32 so as to be quantized and converted to a binary code. The number of the quantizing levels of the video signal $V_{in}$ may suit to $2^8 = 256$.

On the other hand, the signal with the frequency 4 $F_{SC}$ derived from the four-time frequency multiplier 31 is supplied to an FM frequency generator 33, the FM frequency output of which is locked to the synchronizing signal, and from which of one of the respective 256 quantizing levels, FM frequencies $f_0, f_1, f_2, \ldots, f_8$ corresponding to nine levels of $2^0, 2^1, 2^2, \ldots, 2^8$ are produced. In addition to the above FM frequencies, the FM frequency generator 33 produces an FM frequency $f_{SY}$ representing the level of the composite synchronizing signal SY, an FM frequency $f_p$ representing the pedestal level, an FM frequency $f_{B-H}$ representing the high level of the burst signal and an FM frequency $f_{B-L}$ representing the low level of the burst signal. Although further details of the FM frequency generator 33 with the synchronizing lock will be described later, the FM frequencies as described above are all synchronized with the frequency $F_{SC}$. The FM frequencies $f_0$ to $f_8$ and $f_p$ are supplied to a video level FM frequency generator 34 which produces an FM frequency corresponding to respective levels of a sampled video signal which is produced by such a manner that some of the frequencies $f_0$ to $f_8$ and $f_p$ are selected in accordance with the binary codes supplied from the quantizing circuit 32 and representing the video level of the video signal excluding the period of the synchronizing signal. This video level FM frequency generator 34 will be described in detail later. Further, the signal with the frequency 4 $F_{SC}$ derived from the four-time frequency multiplier 31 is introduced into a burst phase signal generator 35, from which signals $F_{B-H}, F_{B-O}$ and $F_{B-L}$ to decide respective phases of the high level, zero level and low level of the burst signal are produced. The burst phase signal generator 35 will also be described later.

The composite synchronizing signal SY derived from the color lock composite synchronizing signal generator 5 is applied through an inverting amplifier 36 to one input terminal of NAND gate 37, while the FM frequency $f_{SY}$ derived from the FM frequency generator 33 is applied to the other input terminal thereof. Then, the output of the NAND gate 37 is supplied to one input terminal of a NOR gate 44. The composite synchronizing signal SY is applied to one input terminal of a NAND gate 39. Besides, the NAND gate 39 is supplied at its other input terminals with the blanking signal BL supplied through an inverting amplifier 38 and with the burst flag signal BF and the FM frequency $f_p$ directly. The output of the NAND gate 39 is supplied to one of the input terminals of the NOR gate 44. The burst flag signal BF is also supplied respectively through an inverting amplifier 40 to one input terminal of each of NAND gates 41, 42 and 43. The NAND gate 41 is supplied at its other input terminals with the phase signal $F_{B-O}$ representing the zero level of the burst signal and the FM frequency $f_p$, while the NAND gate 42 is supplied at its other input terminals with the phase signal $F_{B-L}$ representing the low level of the burst signal and the FM frequency $f_{B-L}$. In addition, the NAND gate 43 is supplied at its other input terminals with the phase signal $F_{B-H}$ representing the high level of the burst signal and the FM frequency $f_{B-H}$, respectively. The outputs of these NAND gates 41, 42 and 43, and the output of the video level FM frequency generator 34 are added to, in addition to the aforesaid inputs, the remaining input terminals of the NOR gate 44. As described above, at the output of the NOR gate 44, there is produced a desired FM frequency synchronized with the subcarrier signal $F_{SC}$.

The vertical driving signal VD generated by the color lock composite synchronizing signal generator 5 is supplied to a flip-flop 46 which produces a field pulse. This field pulse is then supplied to a flip-flop 47, in which a frame pulse is formed.

The circuit shown by a dotted line in FIG. 3 will be mentioned later.

Figure 4:
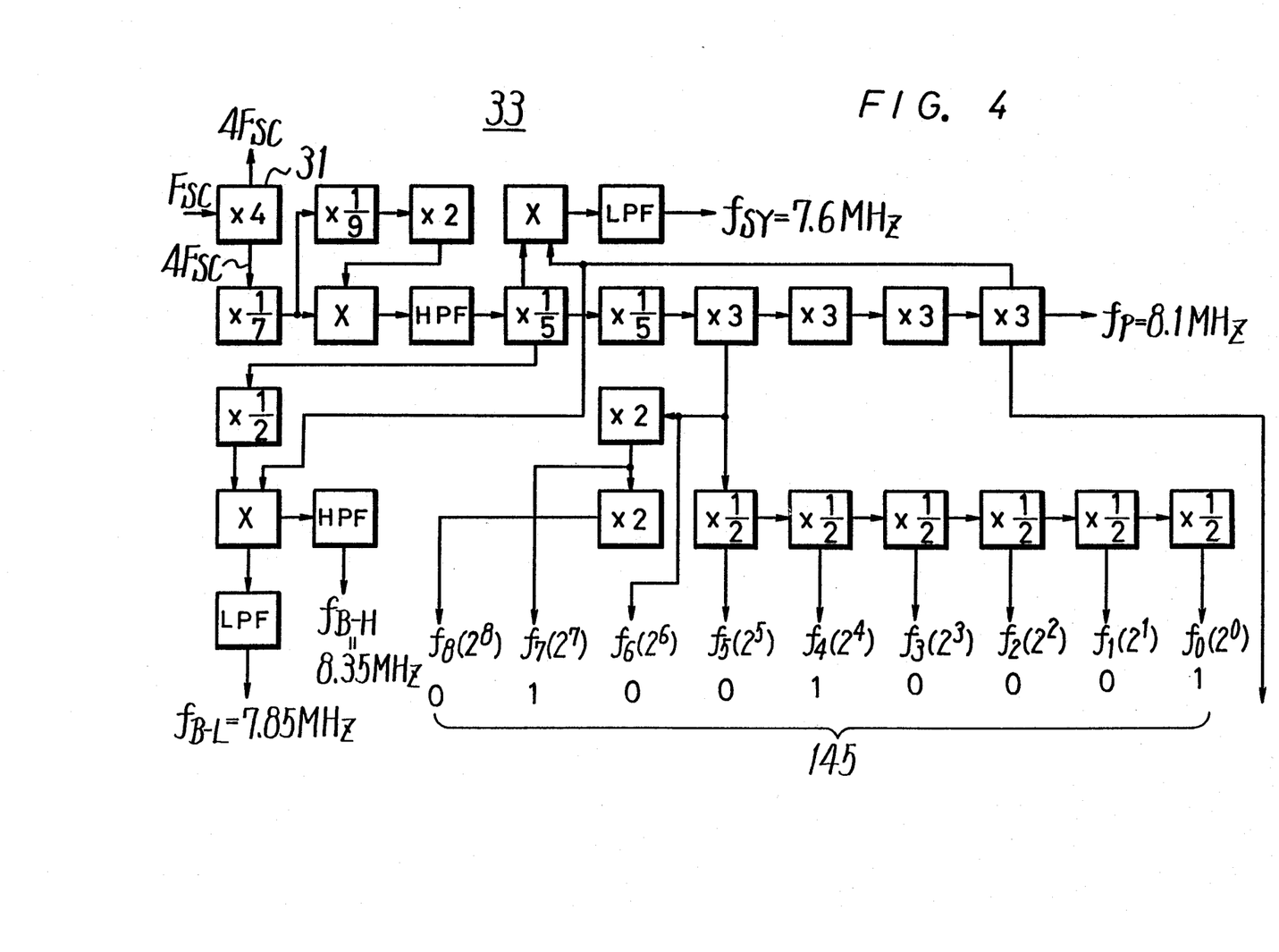
FIG. 4 is a block diagram schematically showing one example of the digital FM frequency generator with the synchronizing lock shown in FIG. 3.

FIG. 4 is a block diagram scehmatically showing an example of the FM frequency generator 33 shown in FIG. 3. In the figure, blocks indicated by x n and x1/n (where n is a positive integer) represent a frequency multiplier to convert a frequency to n times the original frequency and a frequency divider to convert the frequency to 1/n times the original frequency. Blocks indicated by x represent multiplying circuits. Moreover, blocks indicated by HPF represent high pass filters, while blocks indicated by LPF represent low pass filters. These high and low pass filters HPF and LPF serve to derive either of higher (sum) or lower (difference) frequencies from sum the and difference signals between two input frequencies appearing at the outputs of the multiplying circuits X. If with the arrangement shown in FIG. 4 the subcarrier (burst) signal of 3.58 MHz is taken as the base and the frequency multiplying, frequency -dividing and multiplying processes of the frequencies are performed, there are respectively provided frequencies of 7.6 MHz as $f_{SY}$, 8.1 MHz as $f_p$, 8.35 MHz as $f_{B-H}$ and 7.85 MHz as $f_{B-L}$, each being described in FIG. 3, and they are used as respective FM frequencies corresponding to the levels of the composite synchronizing signal SY, the pedestal level, the high level and low level of the burst signals when the video signal is frequency-modulated (refer to FIG. 8). Also, for FM frequencies corresponding to nine quantizing levels of the video signal such as $2^0, 2^1, \ldots, 2^8$, $f_0 \approx 4.69$ kHz, $f_1 \approx 9.37$ kHz, $f_2 \approx 18.7$ kHz, $f_3 \approx 37.5$ kHz, $f_4 \approx 75$ kHz, $f_5 \approx 0.15$ MHz, $f_6 \approx 0.3$ MHz, $f_7 \approx 0.6$ MHz and $f_8 \approx 1.2$ MHz are established. The FM frequency $f_p$ equivalent to the pedestal level is utilized, as will be described later, to compose or mix the video level FM frequencies.

Figure 5A:
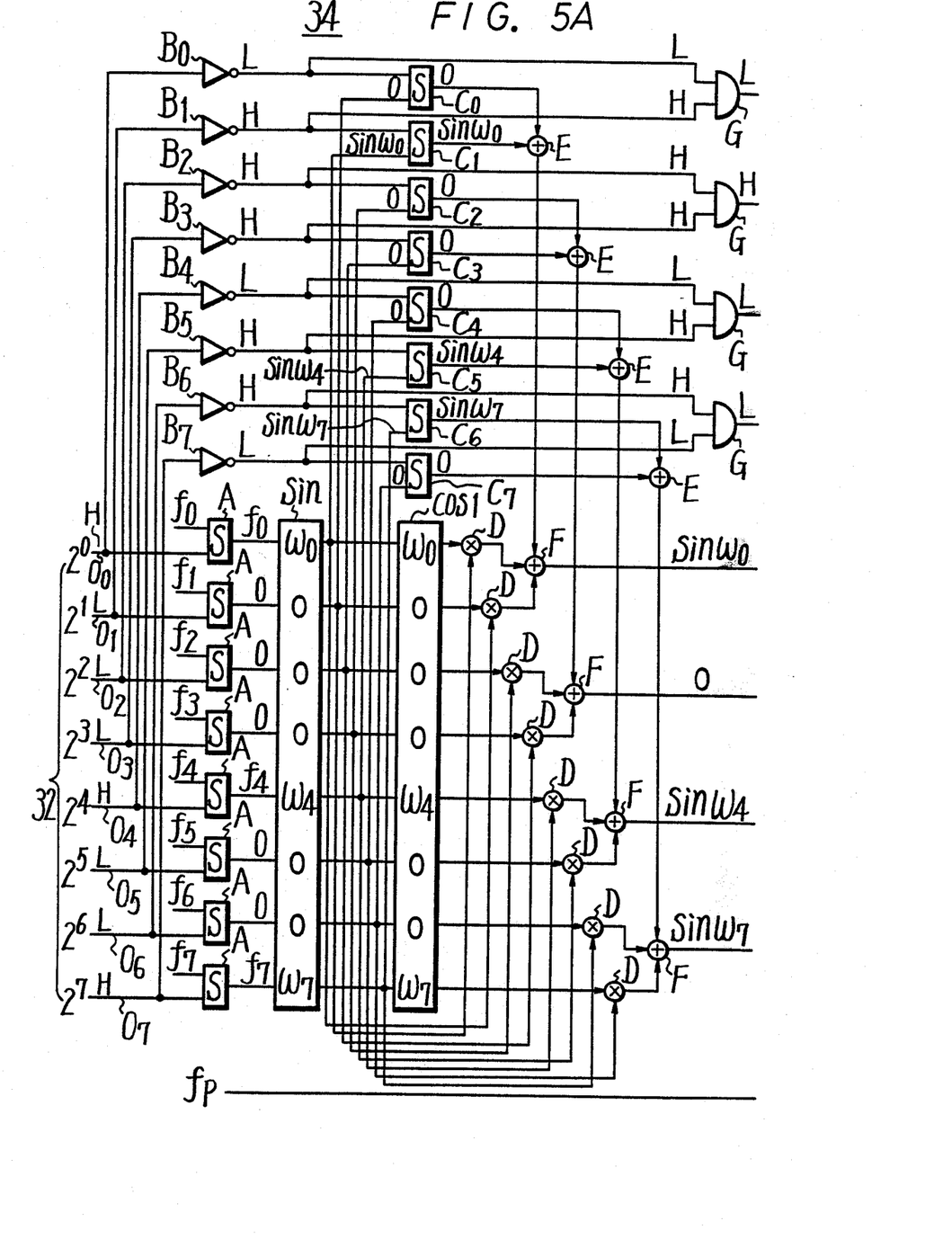
Figure 5B:
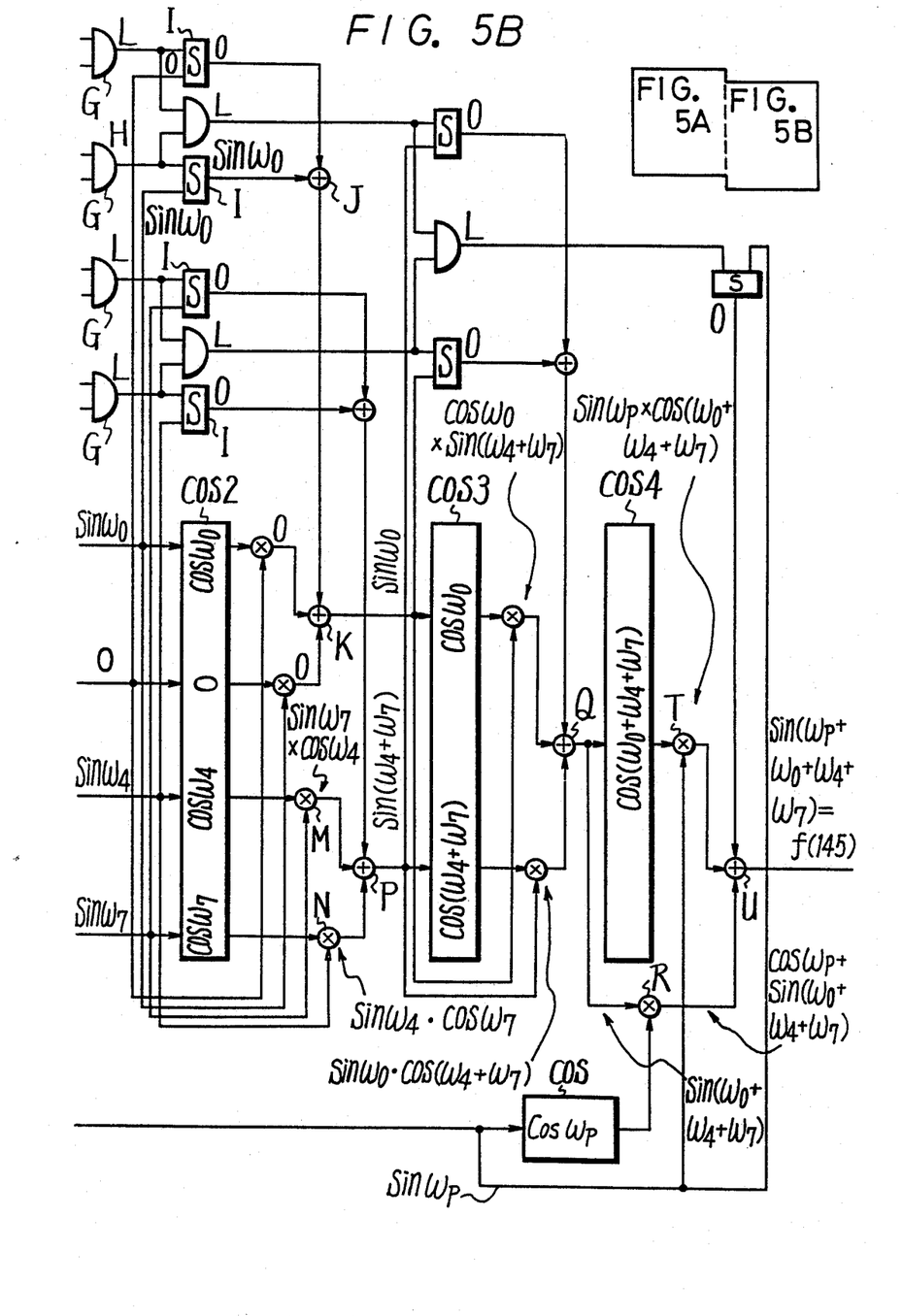

FIG. 5 is a circuit block diagram schematically showing an example of the video level FM frequency generator 34 shown in FIG. 3. In the figure, each of blocks with reference letters S represents an analog switch to allow an analog signal from one input terminal to flow therethrough when a high level signal H appears at the other input terminal, but to inhibit such analog signal from flowing therethrough when a low level signal L appears thereat. Blocks shown by $\otimes$ represent multipliers, blocks shown by $\oplus$ adders, a block suffixed by sin a sine have section acting as a buffer amplifier in this example and blocks shown by cos, cos 1, cos 2, cos 3 and cos 4 represent phase shifters of 90°, respectively. Taking a case where the quantized video levels are given as 145 as an example for simplicity, operations to mix FM frequencies corresponding to the levels will be described hereinafter.

The binary code representation corresponding to 145 is 010010001 as shown in FIG. 4, so that in FIG. 5 at output lines $O_0$, $O_4$ and $O_7$ corresponding to $2^0$, $2^4$ and $2^7$ of respective output lines $O_0, O_1, \ldots, O_7$ corresponding to $2^0, 2^1, \ldots, 2^8$ of the quantizing circuits 32 of FIG. 3, there appear high level signals H, while at other output lines $O_1$ to $O_3$ and $O_5$, $O_6$, there remain the low level signals L (in the figure, an output line corresponding to $2^8$ is omitted in brevity). Accordingly, the analog switches S of the first stage connected by the output lines $O_0$ to $O_7$ at their one input terminals (shown by reference letters A) permit only the FM frequencies $f_0$, $f_4$ and $f_7$ of $f_0, f_1, f_8$, which are supplied at their other input terminals from the FM frequency generator 33 shown in FIGS. 3 and 4, to be passed therethrough and then supplied to the sine wave section at the next stage or buffer amplifier sin. If angular velocities of the FM frequencies $f_0$ to $f_8$ are respectively taken as $\omega_0$ to $\omega_8$, the FM frequencies are expressed as $f_0 = \sin \omega_0$, $f_1 = \sin \omega_1$, $f_2 = \sin \omega_2 \ldots$, $f_8 = \sin \omega_8$. The $\sin \omega_0$, $\sin \omega_4$ and $\sin \omega_7$ passing through the buffer amplifier sin are sent to a first phase shifter cos 1, in which they are phase-shifted by 90° so as to be converted to $\cos \omega_0$, $\cos \omega_4$ and $\cos \omega_7$, while the $\sin \omega_0$, $\sin \omega_4$, and $\sin \omega_7$ are also applied to one input terminals of the analog switches S (shown by letters $C_0$ to $C_7$) which are connected at their other input terminals with the output lines $O_0$ to $O_7$ through the inverting amplifiers $B_0$ to $B_7$, each of which inverts the aforesaid high and low level signals H and L, and to the multiplier $\otimes$ shown by letters D) provided at the output side of the first phase shifter cos 1. The respective sin signals applied to the above analog switches S, namely, $C_1$, $C_5$, $C_6$ are supplied at other input terminals thereof with the high level signals H, which are provided by inverting the low level signals L, so that they are passed through the analog switches S, namely, $C_1$, $C_5$, $C_6$ and further supplied through adders $\oplus$ (shown by letters E) to adders $\oplus$ (shown by letters F) at the output side of the first phase shifter cos 1. In the above multipliers shown $\otimes$ by letters D, even if one input terminals thereof are supplied with the signal sin or signal cos from the first phase shifter cos 1, the other input terminals thereof are applied with O signals, so that all of their outputs become zero. Therefore, the respective signals $\sin \omega_0$, $\sin \omega_4$ and $\sin \omega_7$ are supplied through the foregoing adders $\oplus$ shown by letters F to a second phase shifter cos 2, and as shown in the figure, also supplied respectively to one input terminals of the analog switches S identified by letters I which are supplied at their other input terminals with outputs from the AND gates identified by letters G. In these analog switches S shown by letters I, only the $\sin \omega_0$ signal is passed therethrough by the logic shown in the figure, which is further supplied through adder $\oplus$ shown by letter J to an adder $\oplus$ denoted by letter K and provided at the output side of the second phase shifter cos 2. A signal to be added to the signal sin $\omega_0$ by the adder K at the output side of the second phase shifter cos 2 is zero so that the signal from the adder K is the sin $\omega_0$, which is directly supplied to a third phase shifter cos 3 . Whereas, outputs sin $\omega_7 \cdot \cos\omega_4$ and sin $\omega_4 \cdot \cos \omega_7$ from multiplier ⊕ identified by letters M and N and provided at the output side of the second phase shifter cos 2 are added to each other by an adder P so as to be converted to a sin $(\omega_4 + \omega_7)$, which is supplied to the third phase shifter 3. Similarly, an adder ⊕ denoted by letter Q at the output side of the third phase shifter cos 3 produces a sin $(\omega_0 + \omega_4 + \omega_7)$.

On the other hand, the FM frequency $f_p$ corresponding to the pedestal level is supplied to a phase shifter cos 15 so as to be converted to a cos $\omega_p$, which is multiplied by a multiplier R with the above sin $(\omega_0 + \omega_4 + \omega_7)$ thus resulting in a cos $\omega_p$ sin $(\omega_0 + \omega_4 + '\omega_7)$ At the output side of a fourth phase shifter cos 4 supplied with the sin $(\omega_0 + \omega_4 + \omega_7)$, the sin $\omega_p$ is multiplied with the cos $(\omega_0 + \omega_4 + \omega_7)$ by a multiplier T so as to be converted to a sin $\omega_p \cdot \cos(\omega_0 + \omega_4 + \omega_7)$. Thereafter, the cos $\omega_p \cdot \sin (\omega_0 + \omega_4 + \omega_7)$ is added to the sin $\omega_p \cdot \cos (\omega_0 + \omega_4 + \omega_7)$ by an adder U so as to produce a sin $(\omega_p + \omega_0 + \omega_4 + \omega_7)$ finally. This output signal sin $(\omega_p + \omega_0 + \omega_4 + \omega_7)$ is the very FM frequency corresponding to the video levels 145. Let this output signal sin $(\omega_p + \omega_0 + \omega_4 + \omega_7)$ be $f_{(145)}$. Then $f_{(145)} \approx 8.78$ MHz is established. The FM frequencies corresponding to other video levels of the video signals excluding the synchronizing parts will be mixed or composed similarly.

Figure 6:
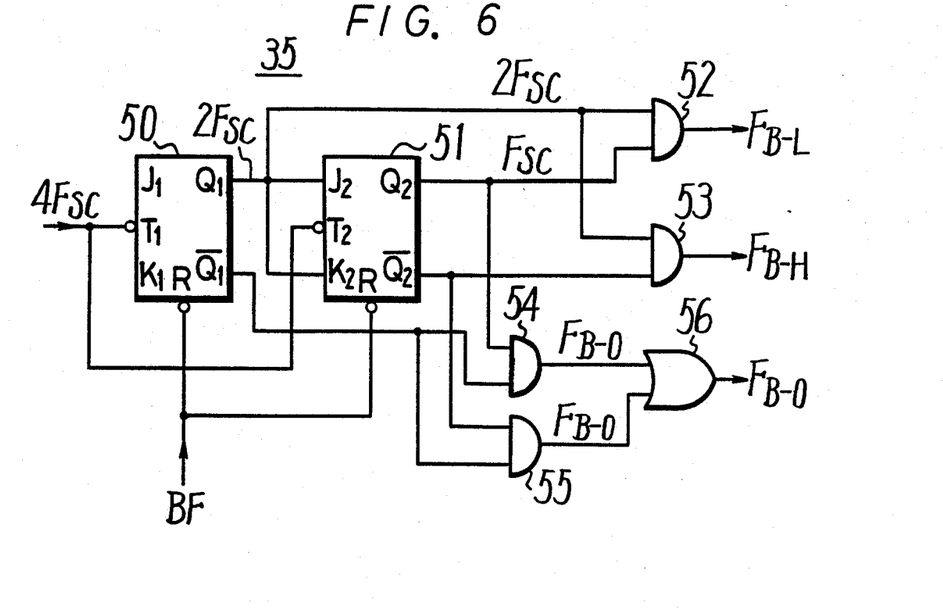
FIG. 6 is a block diagram showing one example of the burst phase signal generator shown in FIG. 3.
Figure 7A:
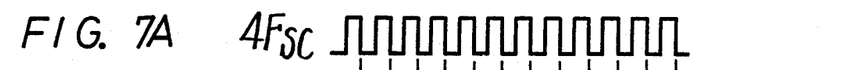
FIGS. 7A through 7G are waveform diagrams each being used to explain the operation of the burst signal generator of FIG. 6.
Figure 7B:
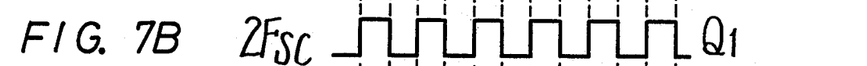
Figure 7C:
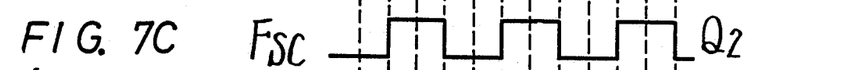
Figure 7D:
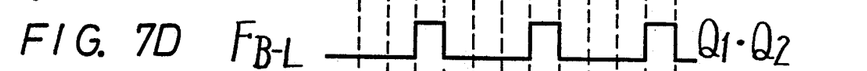
Figure 7E:
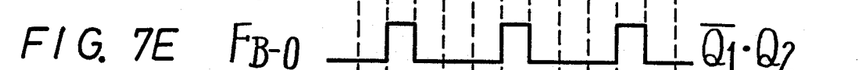
Figure 7F:
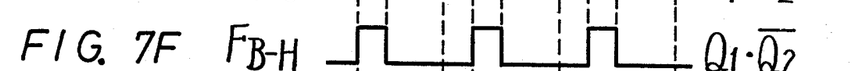
Figure 7G:
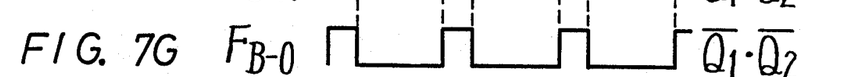

FIG. 6 is a block diagram showing an example of the burst signal generator 35 shown in FIG. 3, and FIGS. 7A through 7G are waveform diagrams each being useful for explaining the operation thereof. In FIG. 6, numerals 50 and 51 designate JK flip-flops for use in dividing the frequencies, 52 to 55 designate AND gates, and 56 designates an OR gate. The frequency 4 $F_{SC}$ (refer to FIG. 7A) derived from the frequency multiplier 31 in FIG. 3 is applied to a terminal $T_1$ of the JK flip-flop 50 and a terminal $T_2$ of the JK flip-flop 51. Thus, the frequency 2 $F_{SC}$ one-half the foregoing frequency 4 $F_{SC}$ is produced at a terminal $Q_1$ of the JK flip-flop 51 (refer to FIG. 7B). At a terminal $Q_2$ of the JK flip-flop 51 which is supplied at its terminals $J_2$ and $K_2$ with the frequency 2 $F_{SC}$ from the terminal $Q_1$ of the flip-flop 50, there is produced a frequency $F_{SC}$ one-half the frequency 2 $F_{SC}$ (refer to FIG. 7). If the outputs 2 $F_{SC}$ and $F_{SC}$ at the terminals $Q_1$ and $Q_2$ are supplied to two input terminals of the AND gate 52, whereby the signal $F_{B-L}$ representing the low level period of the burst signal (refer to FIG. 7D) is produced therefrom. This signal $F_{B-L}$ is applied to the NAND gate 42 shown in FIG. 3. If the outputs at the terminals $Q_1$ and $\overline{Q_2}$ of the flip-flops 50 and 51 are supplied to two input terminals of the AND gate 53, the signal $F_{B-H}$ representative of the high level period of the burst signal is produced (refer to FIG. 7F) therefrom. This signal $F_{B-H}$ is applied to the NAND gate 43 in FIG. 3. Similarly, at the output of the AND gate 54 to the input terminals of which the outputs at the output terminals $\overline{Q_1}$ and $Q_2$ of the flip-flops 50 and 51 are supplied, and at the output of the AND gate 55 to input terminals of which the outputs at the terminals $\overline{Q_1}$ and $\overline{Q_2}$ of the JK flip-flop 50 and 51 are supplied, there are produced two signals $F_{B-O}$ (refer to FIGS. 7E and 7G), each representing the zero level period of the burst signal, which are supplied through an OR gate 56 to the NAND gate 41 shown in FIG. 3.

As stated above, in the digital FM modulation section shown in FIG. 3 according to the present invention, the FM frequencies corresponding to the respective levels of the quantized video signals with the levels of the predetermined number and the FM frequencies corresponding to various synchronizing signals are all locked to the subcarrier (burst) signal $F_{SC}$. Therefore, when the video signal is recorded on the recording disc (refer to FIG. 1) with the one frame on one circle (one rotation of the disc), the difference of the video signals between the neighbouring tracks is generally small so that the dots or pits of the respective tracks are aligned in the radius direction of the disc or arrayed in the same phase.

Figure 8:
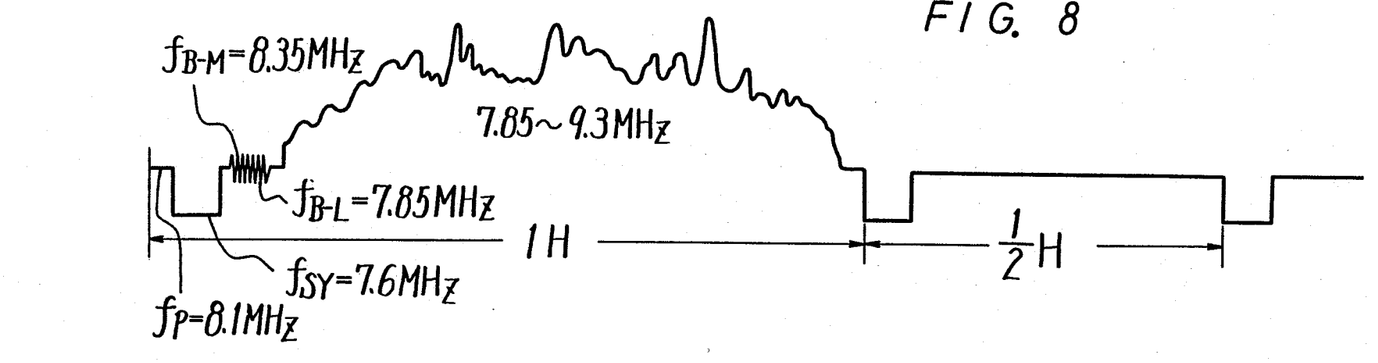
FIG. 8 is an enlarged diagram showing FM frequencies at respective parts of a video signal according to the present invention.

FIG. 8 is an enlarged diagram showing the FM frequencies of the video signals at the respective portions according to the present invention.

Figure 9:
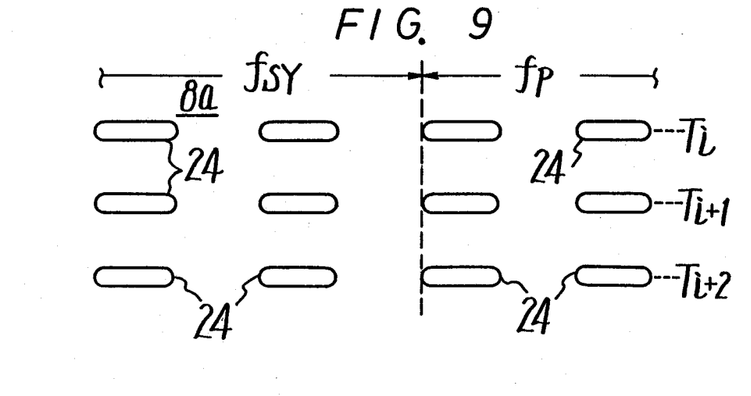
FIG. 9 is an enlarged diagram showing a state where pits are arranged with the same phase as one other.

FIG. 9 is an enlarged diagram showing the arrangement states of the pits 24 near the boundary of the FM frequencies $f_{SY}$ and $f_p$ of the video signal recorded at the FM frequency on the recording surface 8a of the recording disc 8. When the pits 24 are accurately arranged in phase with each other i.e. between the adjacent tracks $T_i$ and $T_{i+1}$ or $T_{i+1}$ and $T_{i+2}$ as seen in the above, in the reproducing mode, free,,from the size of the reproduced beam, the possibility of causing crosstalk and jitter is greatly reduced.

Figure 10:
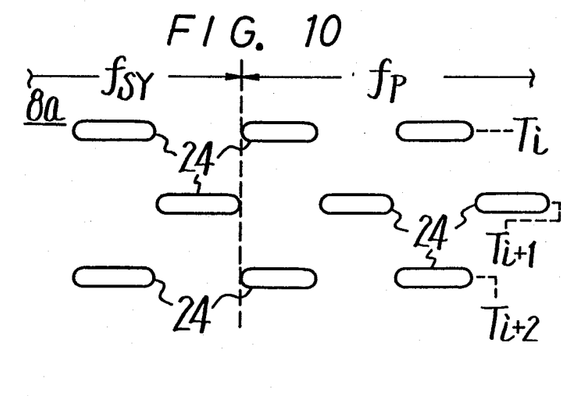
FIG. 10 is an enlarged diagram showing a state where the pits are arranged in opposite phase.

FIG. 10, is an enlarged diagram similar to FIG. 9 showing the situation where the phase of the FM frequency is inverted at every frame in the recording mode. In this case, although the pits 24 are arranged in opposite phase to each other in adjacent, tracks $T_i$ and $T_{i+1}$ or $T_{i+1}$ and $T_{i+2}$, an effect the same as that where the pits 24 are arranged in-phase with one other is also achieved.

To invert the phase of the FM frequency at each frame, it is sufficient to add such circuit arrangement as shown by the dotted line in FIG. 3. That is, the frame pulses in phase and in opposite phase supplied from the flip-flop 47 are supplied to one of the input terminals of each of the NAND gates 58 and 59, while, the output FM frequencies of the NOR gate 44 are on the one hand directly supplied to the other input terminal of the NAN gate 58, and on the other hand is supplied, inverted to other input terminal of the NAND gate 59 via an inverting amplifier 60. Since the NAND gates 58 and 59 produce outputs alternately at every one frame, if these outputs are applied to a NOR gate 61 where their logic sum is calculated, the FM frequency whose phase is inverted at every one frame is produced therefrom.

Although not shown in FIG. 3, the laser sources, the optical system thereof, the recording disc, the driving apparatus, the servo apparatus and the like used in the invention are similar to those of FIG. 1 so that they are not shown in the figure and hence, they will not be described in detail.

While in the above description, the present invention is applied to the both of the periods of the video signal and the synchronizing signal, it is not necessary that the resent invention be limited to the above. That is, the video signal period of the video signal excluding the synchronizing signal period is not quantized similarly to the prior art apparatus, but it is possible they may be frequency-modulated directly.

Figure 11:
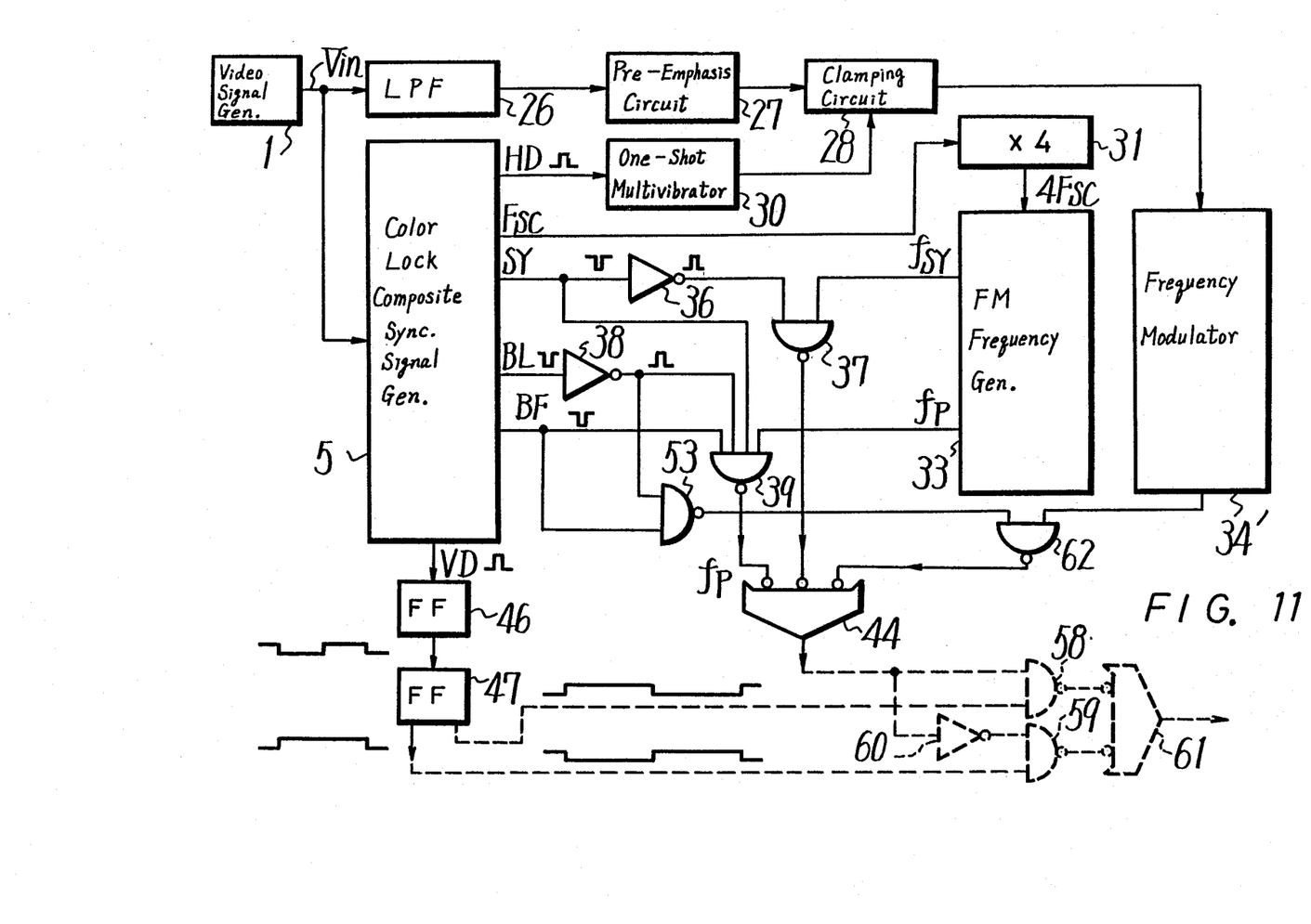
FIG. 11 is a block diagram schematically showing the essential part of another embodiment of the present invention.

FIG. 11 shows the essential part of another embodiment of the present invention where such case is described. The parts of this embodiment different from those of FIG. 3 will be mainly described hereinafter.

Here, the sections for the burst signal and video signal periods of the example shown in FIG. 3 are replaced and instead, a known FM modulator 34' is used. The FM modulator 34' is applied with a television signal containing the synchronizing signal from the clamping circuit 28, where this television signal is frequency-modulated in the same manner as the prior art. The output therefrom is supplied to one input terminal of a NAND gate 62. The NAND gate 62 is supplied at its other input terminal with such a signal formed as follows: the blanking signal BL and the burst flag signal BF are passed through the inverting amplifier 38 and are supplied to input terminals of NAND gate 53, whereby a pulse excluding the burst signal period is formed and then applied to the other input terminal of the NAND gate 62 mentioned above.

The output of the NAND gate 62 is supplied to one input terminal of the NOR gate 44. Other elements and parts on the example of FIG. 11 are substantially the same as those of the example in FIG. 3 and hence detailed descriptions thereof will be omitted.

With the arrangement thus made similarly to the prior art apparatus, the television signal modulated in the FM system by the FM modulator 34' is produced in which the blanking period excluding the burst signal period is removed in the NAND gate 62 and then applied to the NOR gate 44. Accordingly, during the video signal period, similarly to the known apparatus, the pits will never be arranged along the radial line on the recording disc, while during the synchronizing signal period, in a manner same as illustrated in FIG. 3, the pits are recorded on the recording disc in the form of one frame corresponding to one circle, the pits during this interval are radially arranged so that the crosstalk between the tracks at the part of the synchronizing signal are reduced extremely.

Figure 12:
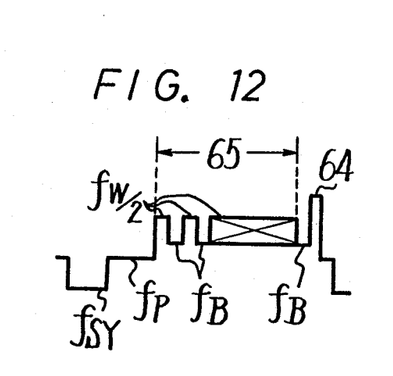
FIG. 12 is a waveform diagram showing signals of other systems to which the present invention is applied.
Figure 13:
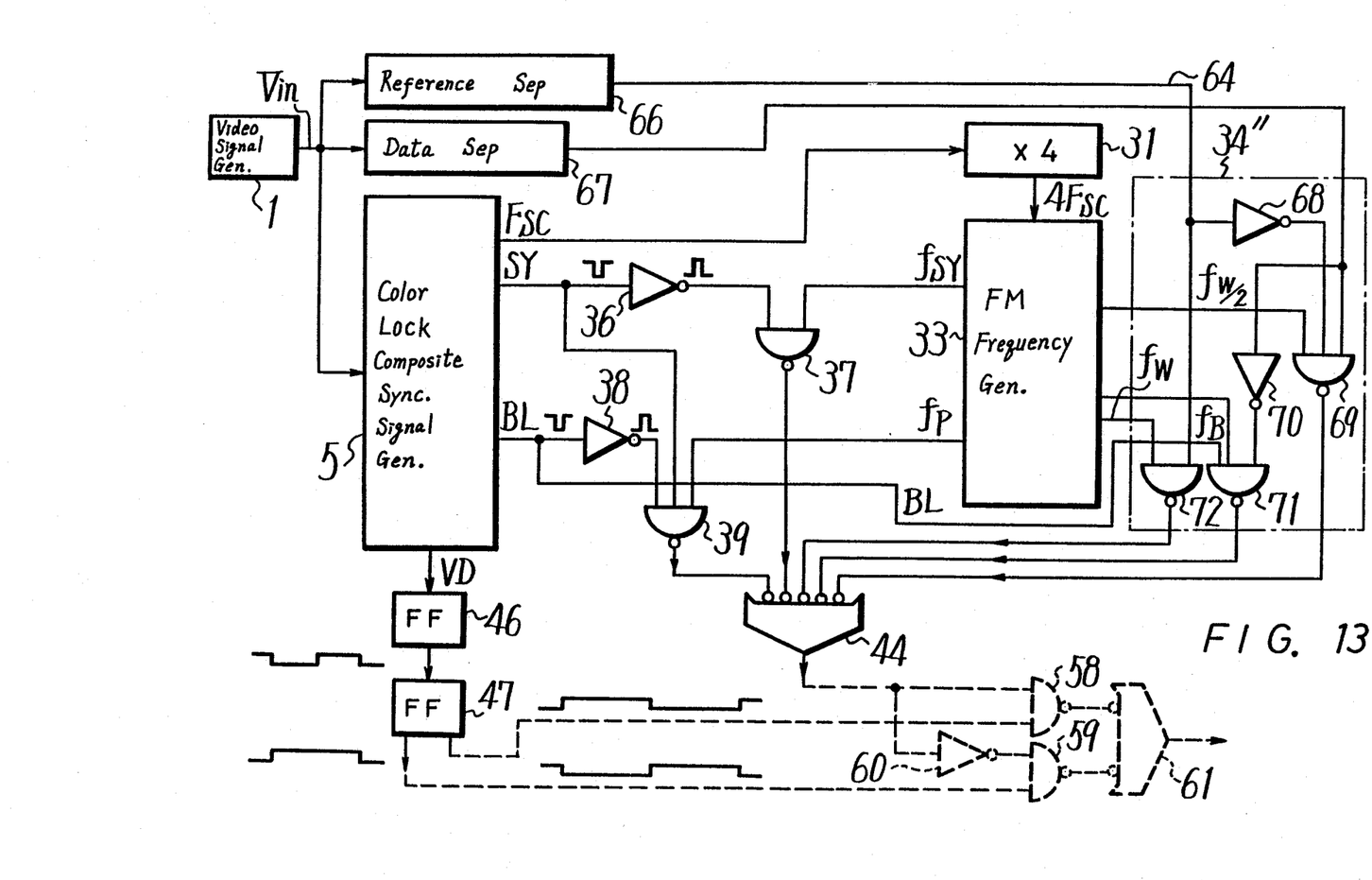
FIG. 13 is a block diagram schematically showing a main part of another embodiment of the present invention which is applied to the example of the signals shown in FIG. 12.

As shown in FIG. 12, the present invention can be applied without difficulty where a signal to be recorded during the video signal period is not of an analog signal system, but of a digital signal system. In this case, the known signal format of the video signal frequently used is formed of, as shown in FIG. 12, a reference signal 64 having a white reference level $f_w$ equal to the white level of the video signal and serving as the reference for the level of the signal and a digital data signal 65. In the above, a high level $f(w/2)$ of the digital data signal 65 is selected to be one half the level of the white level $f_w$, while a low level $f_B$ of the digital data signal 65 is selected to be the level equal to the black level of the video signal. Accordingly, in this case, the digital FM signal generator of FIG. 3 is simplified in construction to be such as shown in FIG. 13. That is, in FIG. 13, the reference signal separating circuit 66, which receives the video signal $V_{in}$ from its generator 1, is provided to separate the part of the video signal $V_{in}$ in FIG. 12 exceeding the one-half level $f(w/2)$ of the white level. Also, a data separating circuit 67 is supplied with the video signal $V_{in}$ to separate the part of the video signal $V_{in}$ exceeding the black level $f_B$. Since these separating circuits 66 and 67 can be easily constructed by using the known level comparing circuit or comparator, they will not be described in detail.

Figure 14:
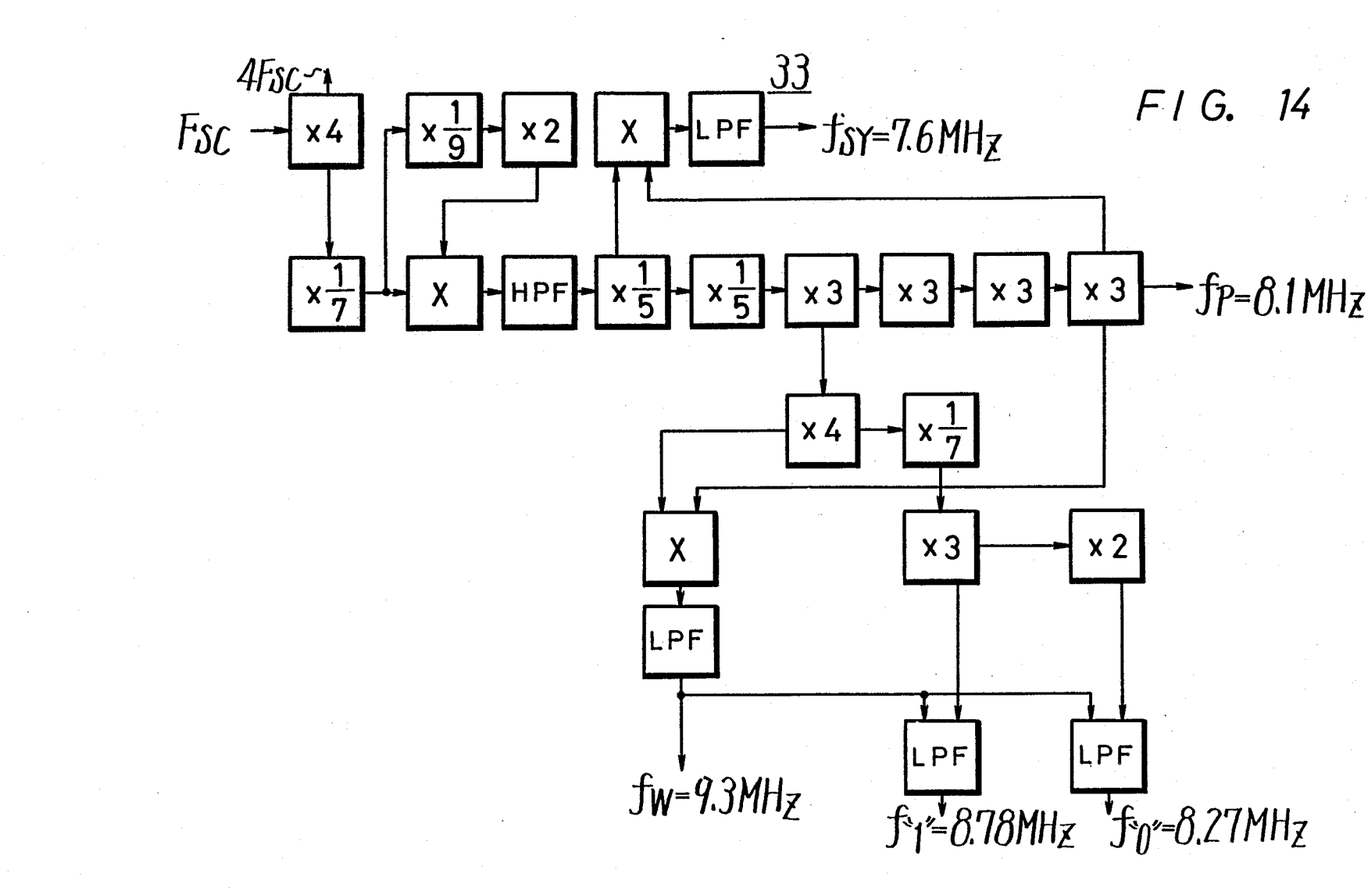
FIG. 14 is a block diagram schematically showing part of the digital FM frequency generator with the synchronizing lock shown in FIG. 13.

One example of the FM frequency generator 33 shown in FIG. 13 is given in FIG. 14. This FM frequency generator 33 according to the example of FIG. 14 has fewer kinds of the frequencies generated than those of FIG. 4. But, based upon the similar principle to that of FIG. 4, respective frequencies of $f_w=9.3$ MHz, $f(w/2)=8.78$ MHz, $f_B=8.27$ MHz, $f_{SY}=7.6$ MHz and $f_p=8.1$ MHz corresponding to a white reference level $f_w$ synchronized with the subcarrier signal $F_{SC}$, a data "1" level (one half the white level), namely, $f(w/2)$, data "0" level (black level), namely, $f_B$, the synchronizing signal level $f_{SY}$ and the pedestal level $f_p$, which are all synchronized with the signal $F_{SC}$, are produced. Also, in the example of FIG. 13, of the above respective frequencies, the frequencies $f_{SY}$ and $f_p$ are processed by the NAND gates 37 and 39 similarly to FIG. 3. But, as to the frequency $f_p$, since in this case, the burst signal does not exist as shown in FIG. 12, unlike the case of FIG. 3, the burst flag signal BF is not supplied to the NAND gate 39. As regards the frequencies $f_w$, $f(w/2)$ and $f_B$, as shown in FIG. 13, the periods during which the respective frequencies are produced are determined frequency modulator 34'' based upon the outputs of the respective separating circuits 66 and 67 and then they are applied to the gate 44. In other words, the frequency $f_w$ is supplied to one input terminal of a NAND gate 72, which is supplied at its other input terminal with the output of the separating circuit 66, whereby it is applied to the OR gate 44 during only the period of the reference signal 64 (refer to FIG. 12) separated by the separating circuit 66. Moreover, the frequency $f(w/2)$ is applied through a NAND gate 69 to the OR gate 44 during only the period during which the digital data signal 65 separated by the separating circuit 67, is at high level. However, the NAND gate 69 is applied with the signal provided by inverting the reference signal 64 by an inverting amplifier 68, so that the frequency $f(w/2)$ will never be mixed into the period of the reference signal 64.

Also, the output of the separating circuit 67 is inverted by an inverting amplifier 70 and supplied to a NAND gate 71, so that the frequency $f_B$ is applied to the OR gate 44 during only the period in which the digital data signal 65 is at low level. But, the NAND gate 71 is applied with the blanking signal BL so that the frequency $f_B$ will never be mixed into the blanking period including the synchronizing signal and the like.

If the circuitry is arranged so far, similarly to the description of FIG. 3, when the digital information is recorded on the video disc in the television signal system, it is also possible to arrange or form the pits between the adjacent tracks in the alignment state.

While in FIG. 13, the digital information is recorded in the system of television signal, the digital information is not necessary recorded thereon in the system of television signal. In short, it is sufficient that the respective digital informations are recorded interposing the synchronizing signal therebetween with a constant interval.

Figure 15:
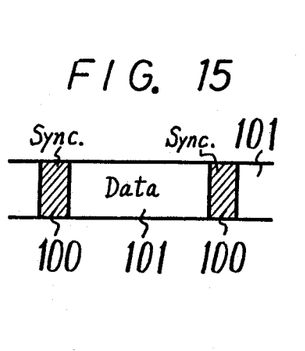
FIG. 15 is a diagram showing a signal format of a signal to which the present invention can be applied.

By way of example, as shown in FIG. 15, the present invention can also be applied to such a signal format that a digital data 100 formed of the synchronizing signal and a digital data 101 formed of the data signal system are arranged one after another. In this case, when both the digital data 100 and 101 are of NRZ (non return to zero) system, as shown in FIG. 17, two frequencies $f_H$ and $f_L$ synchronized with the NRZ signals corresponding to high level "1" and low level "0" of this NRZ signals are formed, in which similarly to the above, the frequency $f_H$ is passed during the period of the high level "1", and the frequency $f_L$ is passed during the period of the low level "0" thus the FM output is produced.

Figure 16:
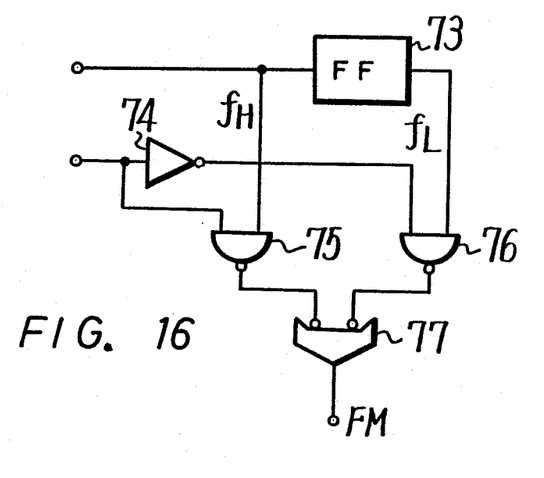
FIG. 16 is a block diagram schematically showing the FM frequency generator with the synchronizing lock according to the other embodiment of the present invention.
Figures 17A, 17B:
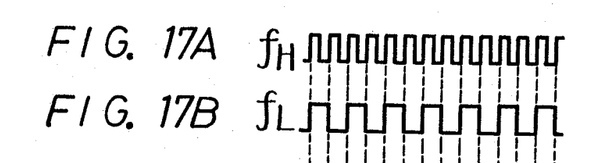
FIGS. 17A to 17D are waveform diagrams each being used to explain the operation of the FM frequency generator with the synchronizing lock in FIG. 16.
Figures 17C, 17D:
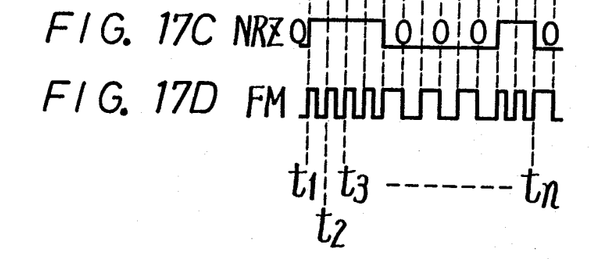

FIG. 16 is a schematic block diagram showing a synchronizing lock FM frequency generator for such purpose as described above, while FIGS. 17A through 17D are waveform diagrams of the above signals at the respective parts. To be more definite, a clock signal $f_H$, which, as shown in FIG. 17A, rises up at times $t_1, t_2, \ldots, t_n$ on the boundaries of the intervals assigned to one-bit data of the NRZ signal shown in FIG. 17C and has a period equal to the width of the interval of one bit thereof, is employed. This clock signal $f_H$ is directly applied to one input terminal of NAND gate 75 shown in FIG. 16 as the frequency $f_H$. Also, the above clock signal $f_H$ is frequency-divided into $\frac{1}{2}$ by a frequency-dividing flip-flop 73 so as to produce a signal $f_L$ rising or falling at the above times $t_1, t_2, \ldots, t_n$ shown in FIG. 17B, which is supplied to one input terminal of a NAND gate 76. The NAND gates 75 and 76 are respectively supplied at their other input terminals with the NRZ signal and a signal provided by inverting the NRZ signal by an inverting amplifier 74. The outputs of these NAND gates 75 and 76 are applied to a NOR gate 77 to produce an FM signal output shown in FIG. 17D.

Whereas, the rotation of a disc on which this FM signal is recorded is synchronized with the above clock signal $f_H$, and the rotational period thereof is selected to be some integer times the period in which the digital data 100 of the above synchronizing signal is generated.

Figure 18:
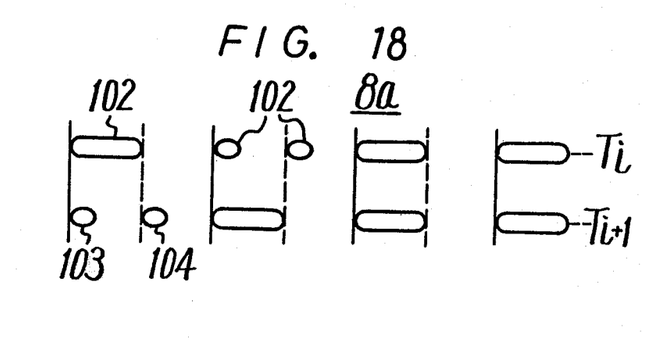
FIG. 18 is an enlarged diagram showing the arrangement state of the pits.

With the arrangement thus composed, similarly to the above embodiment, the synchronizing signal is recorded on the radial line of the disc with the alignment state so that during the synchronizing interval, the pit arrangement is aligned. Therefore, even if the crosstalk occurs between the adjacent tracks, no trouble will be caused. Furthermore, as shown in FIG. 18, since between the adjacent tracks $T_i$ and $T_{i+1}$, a rising time of a pit 102 of the FM signal recorded on the first track $T_i$ is coincident with rising times of pits 103 and 104 of the FM signal recorded on the second track $T_{i+1}$ or falling times thereof, by way of example, when a crosstalk derived from the pit 104 in the second track $T_{i+2}$ is detected after the pit 102 in the first track $T_i$ is detected, it is detected that the pit 102 in the first track $T_i$ is extended by the length of the pit 104 in the second track $T_{i+1}$. Accordingly, the front or leading edge of the pit 102 is not fluctuated. Also, when the crosstalk is detected from the pit 103, the leading edges of the pits 102 and 103 are coincident with one other so that the leading edge of the pit 102 is not fluctuated.

The above description is given of the preferred embodiments of the invention, but it will be apparent that many modifications and variations could be effected by one skilled in the art without departing from the spirit or scope of the novel concepts of the invention, so that the scope of the invention should be determined by the appended claims only.

We claim as our invention:

1. A recording disc on which is recorded a frequency modulated (FM) signal provided by frequency-modulating a carrier signal by a recording signal including repeating synchronizing signals equal in width and level and generated by predetermined intervals, said FM signal having a higher frequency than said recording signal and being recorded on concentric or spiral tracks on the recording surface of said disc in the form of spaced dots, the distance between adjacent waveforms of said FM signal, each of said repeating synchronizing signals comprising a series of dots, series of dots in each synchronizing signals being arranged in each of said tracks at predetermined intervals from the series of dots in the next adjacent synchronizing signal, and the individual dots in each synchronizing signal being arranged in radial alignment with corresponding dots in the corresponding synchronizing signal in the next radially adjacent track whereby the individual corresponding dots in all of said synchronizing signals recorded on said disc lie in predetermined radii relative to the center of said dots.

2. A recording disc as claimed in claim 1, wherein each of said dots is formed from the series of dots in the next adjacent synchronizing signals, and as a hole or protrusion on said recording surface of the disc.

3. A recording disc as claimed in claim 1, wherein each of said dots is a point where a magnetic property on said recording surface of said disc is varies.

4. A recording disc as claimed in claim 1, wherein each of said dots is a point where an optical property on said recording surface of said disc is varied.

* * * * *